United States Patent
Kahl et al.

(10) Patent No.: US 9,524,818 B2
(45) Date of Patent: Dec. 20, 2016

(54) LIFTING ARMATURE ACTUATOR

(75) Inventors: Sebastian Kahl, Forchtenberg (DE); Martin Ottliczky, Forchtenberg (DE)

(73) Assignee: Buerkert Werke GmbH, Ingelfingen (DE)

( * ) Notice: Subject to any disclaimer, the term of this patent is extended or adjusted under 35 U.S.C. 154(b) by 685 days.

(21) Appl. No.: 13/433,344

(22) Filed: Mar. 29, 2012

(65) Prior Publication Data

US 2013/0257571 A1 Oct. 3, 2013

(30) Foreign Application Priority Data

Mar. 30, 2011 (DE) ........................ 20 2011 004 616

(51) Int. Cl.
*H01F 7/08* (2006.01)
*H01F 7/16* (2006.01)
*H01F 7/18* (2006.01)
*H01F 7/123* (2006.01)
*H01F 7/127* (2006.01)

(52) U.S. Cl.
CPC .............. *H01F 7/08* (2013.01); *H01F 7/1607* (2013.01); *H01F 7/1844* (2013.01); *H01F 7/123* (2013.01); *H01F 7/127* (2013.01); *H01F 2007/185* (2013.01)

(58) Field of Classification Search
USPC .................. 335/256, 266, 268, 281
See application file for complete search history.

(56) References Cited

U.S. PATENT DOCUMENTS

| | | | | |
|---|---|---|---|---|
| 1,940,586 A | * | 12/1933 | Fereday | 335/239 |
| 2,235,533 A | * | 3/1941 | Roberts | 33/544.3 |
| 2,358,828 A | * | 9/1944 | Ray | 335/281 |
| 2,728,880 A | * | 12/1955 | Ashworth | 335/230 |
| 2,850,685 A | * | 9/1958 | Ray | 335/270 |
| 2,924,753 A | * | 2/1960 | Smith | 361/80 |
| 3,184,651 A | * | 5/1965 | Albosta | 361/210 |
| 3,548,353 A | * | 12/1970 | Bausch | 335/276 |
| 3,671,814 A | | 6/1972 | Heinrich | |
| 4,656,400 A | * | 4/1987 | Pailthorp et al. | 318/135 |
| 4,905,121 A | | 2/1990 | Uetsuhara et al. | |
| 5,139,226 A | * | 8/1992 | Baldwin et al. | 251/129.2 |
| 5,303,012 A | | 4/1994 | Horlacher et al. | |

(Continued)

FOREIGN PATENT DOCUMENTS

| CN | 1557007 | 12/2004 |
|---|---|---|
| CN | 101688624 | 11/2011 |

(Continued)

OTHER PUBLICATIONS

German Search Report dated Feb. 27, 2012.

*Primary Examiner* — Mohamad Musleh

(74) *Attorney, Agent, or Firm* — Carlson, Gaskey & Olds, PC

(57) ABSTRACT

An electromagnetic lifting armature actuator, in particular for valves, comprises an armature rod which can be shifted in the direction of its longitudinal axis, and a magnetic yoke comprising a first yoke leg and a second yoke leg which is coaxial to the armature rod. A first magnet coil encloses the first yoke leg and a second magnet coil encloses both the second yoke leg and the armature rod. One of the magnet coils is a working and measuring coil which can be selectively used for enhancing the magnetic force or for determining a position of the movable armature rod.

16 Claims, 2 Drawing Sheets

(56) References Cited

U.S. PATENT DOCUMENTS

| | | | |
|---|---|---|---|
| 5,311,125 A * | 5/1994 | Krause et al. | 324/201 |
| 5,458,150 A * | 10/1995 | Tamaoki et al. | 137/596.17 |
| 6,726,173 B2 * | 4/2004 | Hettinger et al. | 251/129.17 |
| 6,798,636 B2 * | 9/2004 | D'Alpaos et al. | 361/160 |
| 2002/0067100 A1 | 6/2002 | Rieck et al. | |
| 2003/0107018 A1 | 6/2003 | Hettinger et al. | |
| 2004/0239178 A1 * | 12/2004 | Otsuka | 303/119.3 |
| 2010/0123093 A1 | 5/2010 | Beyer et al. | |
| 2012/0255353 A1 * | 10/2012 | Kozaki et al. | 73/305 |

FOREIGN PATENT DOCUMENTS

| | | |
|---|---|---|
| DE | 3123525 A1 | 12/1982 |
| DE | 3150814 A1 | 6/1983 |
| GB | 2205198 A | 11/1988 |

\* cited by examiner

LIFTING ARMATURE ACTUATOR

TECHNICAL FIELD

The invention relates to an electromagnetic lifting armature actuator, in particular for valves, comprising an armature rod which can be shifted in the direction of its longitudinal axis, a magnetic yoke comprising a first yoke leg and a second yoke leg which is coaxial to the armature rod, a first magnet coil enclosing the first yoke leg, and a second magnet coil enclosing both the second yoke leg and the armature rod.

BACKGROUND OF THE INVENTION

Lifting armature actuators are very common in valves as well as in relays and are particularly suitable for miniaturized designs.

The generic EP 2 189 992 A1 shows such a lifting armature actuator for valves, with which high magnetic forces can be achieved with small constructional size and whose components can be freely combined with one another in diverse variants. Thus, an adaptation to a given installation space is possible without the need of manufacturing specific components. The same standardized components are merely combined with one another in a different way.

SUMMARY OF THE INVENTION

A compact lifting armature actuator is provided in which a position of the movable armature rod can be determined with small expenditure.

This is achieved by an electromagnetic lifting armature actuator in which one of the magnet coils is a working and measuring coil that can be selectively used for enhancing the magnetic force or for determining the position of the movable armature rod.

The invention is based on the knowledge that the required (attraction) force for moving the armature rod from its first axial end position (position of rest) to its opposite, second axial end position (position of activation) is larger than the required (retention) force for fixing the armature rod in the second axial end position. It has turned out that in the end position of the armature rod one of the magnet coils can be used as a measuring coil for determining the position of the movable armature rod because the possibly required retention force can be exerted by the other magnet coil. As the two magnet coils are further arranged in a common iron circuit, the position of the armature rod can be determined by the measuring coil signals with particularly high accuracy.

It is preferred that the two yoke legs are aligned to be parallel and spaced from each other. In view of the installation space, which usually is very limited in particular in the axial direction, an extremely compact actuator construction is provided with small axial height.

In one embodiment of the lifting armature actuator, the magnetic yoke comprises at least one transverse web which is engaged by the first yoke leg as well as by the second yoke leg. This is a simple possibility to close the magnet or iron circuit defined by the magnetic yoke in the region of the transverse web while maintaining an axially compact construction, and thus to enhance the achievable magnetic force of the actuator.

It is particularly preferred that the magnetic yoke comprises two parallel transverse webs spaced from each other, with the first yoke leg connecting the two transverse webs and extending perpendicularly to the transverse webs. The second yoke leg is spaced from the first yoke leg and likewise extends perpendicularly to the transverse webs, the armature rod being guided to be axially movable and to project through a transverse web and define an air gap together with the second yoke leg. This construction allows production of an extremely compact lifting armature actuator with low expenditure, capable of providing high magnetic forces.

Specifically, the first magnet coil may be the working and measuring coil and the second magnet coil may be a working coil. Thus, the magnet coil enclosing the movable armature rod is always a (genuine) working coil which upon actuation of the lifting armature actuator immediately acts on the armature rod so that the power loss is minimized. Alternatively, it is also possible that the first magnet coil is a (genuine) working coil and the second magnet coil is the working and measuring coil.

In one embodiment of the lifting armature actuator, the two magnet coils are of identical construction. This allows a reduction of the number of different individual parts for the lifting armature actuator, which has a favorable effect on the assembly expenditure as well as on stock-keeping.

In a further embodiment of the lifting armature actuator, the magnet coils are each connected to a control device via an electrical connector. A precision resistor as well as a voltmeter or ammeter is provided on the connector of the magnet coil used as the working and measuring coil. This minimum supplementation of the lifting armature actuator by a precision resistor and a voltmeter or ammeter in the connector of merely one of the magnet coils is already sufficient—in combination with a variable, suitable control scheme by the control device—to be able to selectively use this magnet coil as a working or measuring coil.

The invention further relates to a valve, in particular a miniaturized magnet valve, comprising a lifting armature actuator as described above, the armature having an outer axial end face provided with a sealing body which cooperates with a sealing seat of the valve.

Alternatively, the invention also relates to a valve comprising a lifting armature actuator as described above, the armature rod with an outer axial end face actuating a rocker switch which in turn actuates a membrane cooperating with two sealing seats of the valve.

In a design variant of the valve, a separation of media is provided between the lifting armature actuator and a fluid side of the valve, the components of the magnetic yokes being comprised of a material with high saturation magnetization such as cobalt-iron. Using a material of this type has a positive effect on the magnetic force which can be achieved on the armature rod. The disadvantageous susceptibility of the material to corrosion can be accepted due to the separation of the media, as none of the corresponding parts is in contact with the valve fluid.

In case of valves without a separation of media between the lifting armature actuator and the fluid side, the components of the magnetic yoke which are in contact with fluid are comprised of a corrosion-resistant material such as steel. Owing to the resistance to corrosion which is required because of the fluid contact, the material which is more unfavorable in terms of its magnetic behavior and thus a smaller achievable magnetic force on the armature rod have to be accepted in this case.

Compared to a design made of a material with high saturation magnetization, the components of the magnetic yoke which are in contact with fluid are preferably realized with larger physical dimensions in order to compensate for the reduction of the magnetic force at least in part.

BRIEF DESCRIPTION OF THE DRAWINGS

Further features and advantages of the invention will be apparent from the following description of preferred embodiments with reference to the drawings in which.

DETAILED DESCRIPTION

Figure 1:
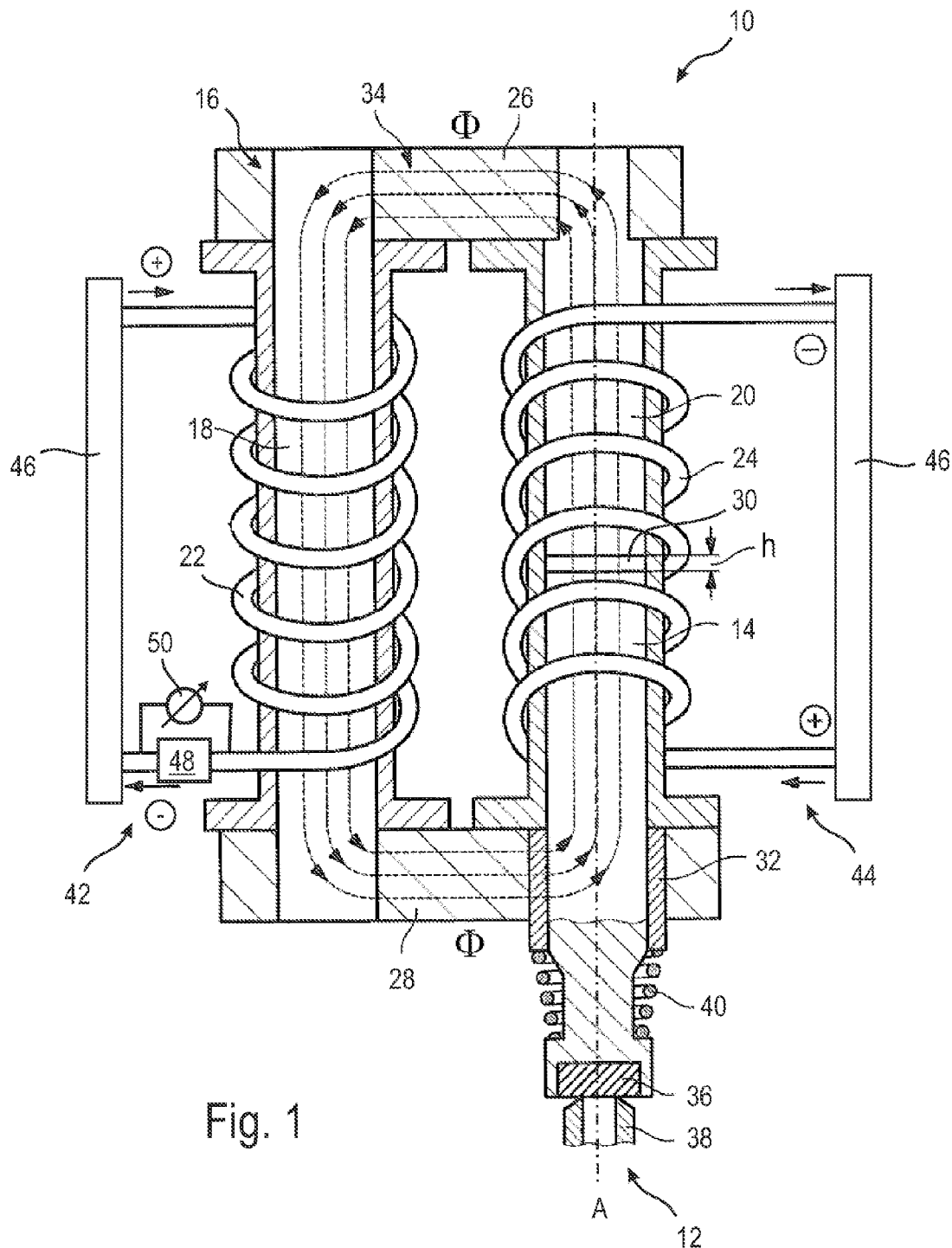
FIG. 1 is a schematic diagram of a magnet valve according to the invention comprising a lifting armature actuator of the invention.

FIG. 1 shows an electromagnetic lifting armature actuator 10 for a valve 12, comprising an armature rod 14 which can be shifted in the direction of its longitudinal axis A, and a magnetic yoke 16 comprising a first yoke leg 18 and a second yoke leg 20 which is coaxial to the armature rod 14. The lifting armature actuator 10 further comprises two magnet coils 22, 24. A first magnet coil 22 encloses the first yoke leg 18 and a second magnet coil 24 encloses the second yoke leg 20 as well as the armature rod 14.

The two yoke legs 18, 20 spaced from each other are aligned to be parallel and are connected by a transverse web 26 of the magnetic yoke 16.

In the exemplary embodiment according to FIG. 1, the magnetic yoke 16 comprises two parallel transverse webs 26, 28 which are spaced from each other. The first yoke leg 18 connects the two transverse webs 26, 28 and extends perpendicularly to the transverse webs 26, 28. The second yoke leg 20 is spaced from the first yoke leg 18 and likewise extends perpendicularly to the transverse webs 26, 28. The armature rod 14 is axially movable and guided to project through the transverse web 28 and defines an air gap 30 together with the second yoke leg 20.

The transverse web 26 has openings which are engaged by the first yoke leg 18 as well as the second yoke leg 20 in a form-fitting manner. The transverse web 28 is provided with an opening which is engaged by the first yoke leg 18 in a form-fitting manner, and with an opening in which a pole sleeve 32 is inserted. The axially movable armature rod 14 projects through this opening of the transverse web 28 and is axially guided by the pole sleeve 32.

Thus, the magnetic yoke 16 constitutes an iron circuit which is only interrupted by the air gap 30 having an axial gap size h between the second yoke leg 20 and the armature rod 14.

The magnet coils 22, 24 can be operated in parallel or series connection. The polarity specified in FIG. 1 results in a flux direction of the magnetic flux Φ which is indicated by arrows 34.

The armature rod 14 extends from an end face adjoining the air gap 30 axially through the pole sleeve 32 inserted in the transverse web 28 as far as to an opposite end face carrying a sealing body 36. The sealing body 36 cooperates with a sealing seat 38 of the valve 12, the latter being indicated in FIG. 1 by this sealing seat 38 only.

A compression spring 40 is supported between a shoulder on the end face of the armature rod 14 and the pole sleeve 32 and biases the armature rod 14 against the sealing seat 38.

The diverse components of the lifting armature actuator 10 may be realized in different sizes and designs and combined with one another in various ways. This is already known from EP 2 189 992 A1 to which reference is made in this regard in its entirety.

The particularity of the electromagnetic lifting armature actuator 10 according to FIG. 1 is that one of the magnet coils 22, 24 is a working and measuring coil which is selectively used for enhancing a magnetic force on the armature rod 14 or for determining the axial position of the movable armature rod 14.

Specifically, the first magnet coil 22 is a "genuine" working coil and the second magnet coil 24 is the already mentioned working and measuring coil. In principle, it is also conceivable that the first magnet coil 22 is the working and measuring coil and the second magnet coil 24 is the pure working coil.

In order to simplify the construction of the lifting armature actuator 10, the two magnet coils 22, 24 may be identical in construction.

The magnet coils 22, 24 are each connected to a control device 46 via an electrical connector 42, 44. The connector 42 of the working and measuring coil is provided with a precision resistor 48 as well as a measuring instrument, in particular a voltmeter 50.

The electrical control device 46 delivers a DC voltage to the second magnet coil 24 in its function as a working coil, and delivers a square wave voltage to it in its function as a measuring coil.

In its function as a working coil, the second magnet coil 24 supports the first magnet coil 22 which likewise is designed as a working coil so that a high axial magnetic force acts on the armature rod 14. This high magnetic force is especially required whenever the armature rod 14 is to be moved from its position of rest (spring-biased lower end position illustrated in FIG. 1) axially towards its position of activation (upper end position, not illustrated). Compared to this, a significantly reduced magnetic force or no magnetic force at all is required for retaining the armature rod 14 in its end position so that the additional magnetic force generated by the second magnet coil 24 can be dispensed with in the end position of the armature rod 14 and the second magnet coil 24 may be used as a measuring coil for determining the position of the armature rod 14. To this end, it is supplied e.g. with a square wave voltage by the electrical control device 46. Although the square wave voltage has turned out to be particularly suitable, it goes without saying that the measuring coil can be excited by other suitable voltage profiles which are common to a person skilled in the art. Here, the frequency of the drive signal of the measuring coil can be optimally adapted to the measuring job. The retaining function for the armature rod 14 is not affected since it is ensured at any time by the other, first magnet coil, independently of the measuring process in the measuring coil. Due to the excitation of the measuring coil, a characteristic signal develops at the voltmeter 50 as a function of the gap size h of the air gap 30. On the basis of this measuring signal, it is possible to easily check whether the armature rod 14 is in its position of rest, in its position of activation or in an intermediate, usually undesired position.

As the two magnet coils 22, 24 are arranged in a common magnet or iron circuit, the second magnet coil 24—in its function as a working coil—is able to support the first magnet coil 22 in producing the magnetic force very efficiently and in its function as a measuring coil it is capable of delivering very precise measuring signals from which the axial position of the armature rod 14 can be determined with high accuracy.

In case the lifting armature actuator 10 is used for an actuation of the seat valve according to FIG. 1, an intermediate position of the armature rod 14 after activation or deactivation of the lifting armature actuator 10 mostly indicates a malfunction, as the valve 12 does not completely open or close. This malfunction is identified by the electrical control device 46 by the measuring signal on the voltmeter 50 and is displayed visually and/or acoustically, for example.

The valve 12 of FIG. 1 actuated by the lifting armature actuator 10 may be realized with or without a separation of media.

In case of a separation of media between the lifting armature actuator 10 and a fluid side of the valve 12, the parts of the lifting armature actuator 10 do not come into contact with a valve fluid. Consequently, the components of the magnetic yoke 16 may be produced from a material with high saturation magnetization such as cobalt-iron, for instance, as the relatively high susceptibility to corrosion of this material is negligible because of the separation of media.

Figure 2:
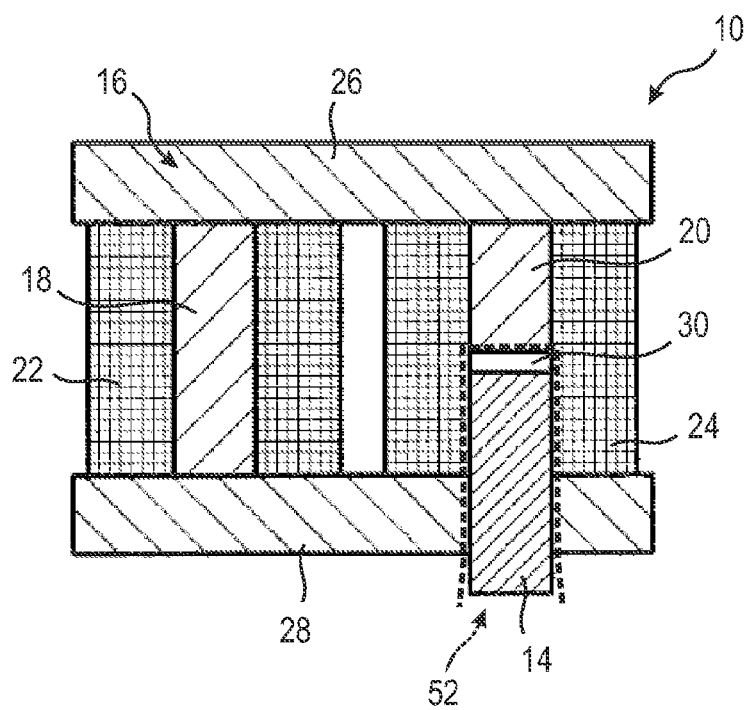
FIG. 2 is a schematic sectional view of the lifting armature actuator according to FIG. 1.

In case of valves 12 without a separation of media between the lifting armature actuator 10 and the fluid side of the valve 12, a region 52 of the lifting armature actuator 10 which is marked in FIG. 2 with a broken line comes into contact with the valve fluid. The components of the lifting armature actuator 10 which are in contact with the fluid such as the armature rod 14 and the second yoke leg 20 are made of a corrosion-resistant material in this case, for instance are made of steel. The worse magnetic properties of this material may be compensated for, if necessary, in that the components of the lifting armature actuator 10 which are in contact with the fluid are realized with larger physical dimensions compared to a design made of a material with high saturation magnetization.

The detection of the position of the armature rod 14 is of special importance in valves 12 without a separation of media. Especially with miniaturized structural shapes, the gap size h of the air gap 30 is very small, for example 0.2-0.6 mm. In case of the formation of deposits between the valve fluid on the end face of the second yoke leg 20 opposite the armature rod 14, the gap size h of the air gap 30 will be undesirably decreased, which may result in a functional impairment, in the extreme case to a functional inability of the valve 12. Due to the process of determining the position of the armature rod 14 according to the invention, an early detection of such deposits is possible and concerned valves 12 may be replaced in due time.

Figure 3:
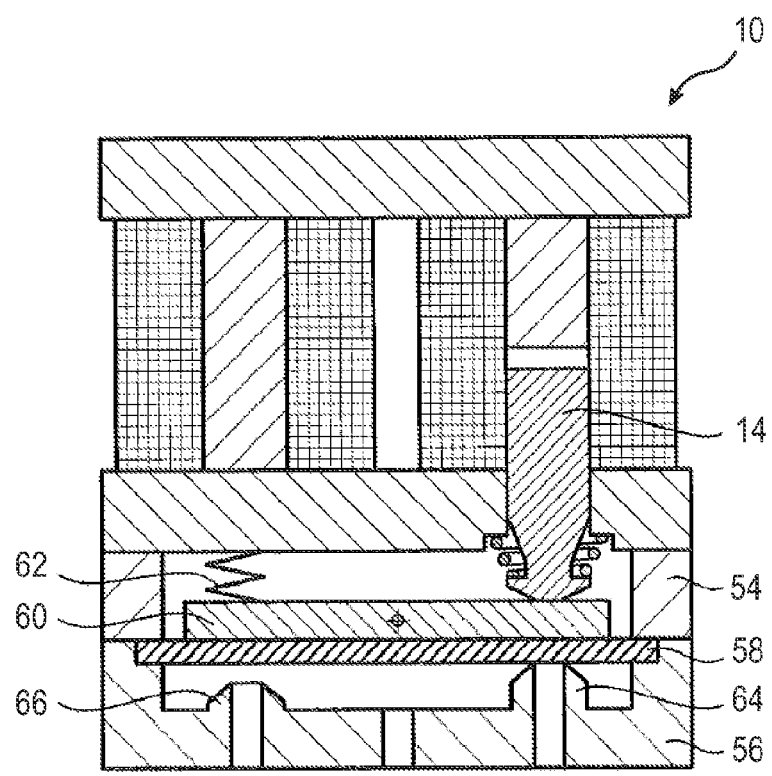
FIG. 3 is a schematic diagram of a magnet valve of the invention according to a further embodiment comprising a lifting armature actuator according to the invention.

FIG. 3 shows the use of the lifting armature actuator 10 as an actuator of a valve 12 according to a further embodiment. In this case, the valve 12 comprises two housing parts 54, 56 which are separated by a membrane 58 clamped therebetween so that it is a valve 12 with separation of media. A rocker switch 60 is pivotally supported in the housing part 54. The armature rod 14 of the lifting armature actuator 10 presses against the one end of the rocker 60, and the other end of the rocker 60 is biased by a compression spring 62. Two sealing seats 64, 66 are formed in the housing part 56. Pivoting the rocker switch 60 moves the membrane 58 towards the one or other sealing seat 64, 66.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An electromagnetic lifting armature actuator, in particular for valves, comprising an armature rod which can be shifted in a direction of a longitudinal axis; a magnetic yoke comprising a first yoke leg and a second yoke leg which is coaxial to the armature rod; a first magnet coil enclosing the first yoke leg and a second magnet coil enclosing both the second yoke leg and the armature rod; a transverse web provided with an opening, and wherein the armature rod projects through the opening of the transverse web; and wherein one of the first and second magnet coils is a working and measuring coil which is selectively used for enhancing a magnetic force when operating under a first condition and is selectively used for determining a position of the armature rod when operating under a second condition, and wherein when operating under the first condition a first type of voltage is applied to the working and measuring coil, and when operating under the second condition a second type of voltage is applied to the working and measuring coil that is different than the first type of voltage.

2. The lifting armature actuator according to claim 1, wherein the first and second yoke legs are aligned to be parallel and spaced from each other.

3. The lifting armature actuator according to claim 1, wherein the transverse web is engaged by the first yoke leg and by the second yoke leg.

4. The lifting armature actuator according to claim 3, wherein the transverse web comprises two parallel transverse webs spaced from each other, the first yoke leg connecting the two transverse webs and extending perpendicularly to the transverse webs, and wherein the second yoke leg is spaced from the first yoke leg and extends perpendicularly to the transverse webs, and wherein the armature rod is guided to be axially movable and to project through one of the transverse webs and defines an air gap together with the second yoke leg.

5. The lifting armature actuator according to claim 1, wherein the first magnet coil is the working and measuring coil and the second magnet coil is a working coil.

6. The lifting armature actuator according to claim 1, wherein the first and second magnet coils are of identical construction.

7. The lifting armature actuator according to claim 1, wherein the first and second magnet coils are each connected to a control device via an electrical connector, and wherein a precision resistor and a voltmeter or ammeter is provided on the electrical connector of the working and measuring coil.

8. The lifting armature actuator according to claim 1, wherein an electrical control device is provided which applies a DC voltage to the working and measuring coil while functioning as a working coil and applies a square wave voltage to the working and measuring coil while functioning as a measuring coil.

9. The lifting armature actuator according to claim 1, wherein the first type of voltage comprises a DC voltage and wherein the second type of voltage comprises a square wave voltage.

10. The lifting armature actuator according to claim 9, including a control device that is connected to each of the first and second magnet coils via at least one connector, and wherein the control device applies the DC voltage to the working and measuring coil while functioning as the working coil and applies the square wave voltage to the working and measuring coil while functioning as the measuring coil.

11. The lifting armature actuator according to claim 10, including a precision resistor and a voltmeter or ammeter associated with the at least one connector.

12. A valve, in particular a miniaturized magnet valve, comprising: a lifting armature actuator comprising; an armature rod which can be shifted in a direction of a longitudinal axis; a magnetic yoke comprising a first yoke leg and a second yoke leg which is coaxial to the armature rod; a first magnet coil enclosing the first yoke leg and a second magnet coil enclosing both the second yoke leg and the armature rod; a transverse web provided with an opening, and wherein the armature rod projects through the opening of the transverse web; wherein one of the first and second magnet coils is a working and measuring coil which is selectively used for enhancing a magnetic force when operating under a first condition and is selectively used for determining a position of the armature rod when operating under a second condition, wherein when operating under the first condition a first type of voltage is applied to the working and measuring coil, and when operating under the second condition a second type of voltage is applied to the working and measuring coil that is different than the first type of voltage; and wherein the armature rod has an outer axial end face provided with a sealing body which cooperates with a sealing seat of the valve.

13. The valve according to claim 12, wherein without a separation of media between the lifting armature actuator and fluid side, the components of the magnetic yoke which are in contact with fluid are comprised of a corrosion-resistant material.

14. The valve according to claim 13, wherein the components of the magnetic yoke which are in contact with fluid are realized with larger physical dimensions compared to a design made of a material with high saturation magnetization.

15. The valve according to claim 12, wherein the first type of voltage comprises a DC voltage and wherein the second type of voltage comprises a square wave voltage.

16. The valve according to claim 15 including a control device that is connected to each of the first and second magnet coils via at least one connector, and wherein the control device applies the DC voltage to the working and measuring coil while functioning as the working coil and applies the square wave voltage to the working and measuring coil while functioning as the measuring coil.

* * * * *